United States Patent [19]
Windley

[11] Patent Number: 5,344,708
[45] Date of Patent: Sep. 6, 1994

[54] BULKED RANDOM COPOLYAMIDE YARNS OF NYLON 6 AND NYLON 6,6 HAVING ENHANCED DYEABILITY

[75] Inventor: William T. Windley, Seaford, Del.

[73] Assignee: E. I. Du Pont de Nemours and Company, Wilmington, Del.

[21] Appl. No.: 156,610

[22] Filed: Nov. 23, 1993

Related U.S. Application Data

[63] Continuation of Ser. No. 882,383, May 12, 1992, abandoned.

[51] Int. Cl.$^5$ ............................................. D02G 3/00
[52] U.S. Cl. .................................. 428/364; 428/395; 525/432; 528/310; 528/324
[58] Field of Search ............... 525/432; 428/364, 395; 528/310, 324

[56] References Cited

U.S. PATENT DOCUMENTS

| | | |
|---|---|---|
| 2,252,555 | 8/1941 | Carothers . |
| 2,252,557 | 8/1941 | Czerwin . |
| 3,536,780 | 10/1970 | Schaat ................................ 528/324 |
| 3,583,147 | 6/1971 | Brizzolara .......................... 525/432 |
| 3,995,084 | 11/1976 | Berger et al. ...................... 525/432 |
| 4,225,699 | 9/1980 | Schmid et al. ..................... 528/324 |
| 4,369,156 | 1/1983 | Mathes et al. ..................... 264/147 |
| 4,467,084 | 8/1984 | Kitagawa et al. .................. 528/324 |
| 4,559,196 | 12/1985 | Kobsa et al. . |
| 4,647,483 | 3/1987 | Tse et al. ............................ 525/432 |
| 4,665,135 | 5/1987 | Tse et al. ............................ 525/432 |
| 4,729,923 | 3/1988 | Windley . |
| 4,919,874 | 4/1990 | Windley . |

Primary Examiner—Patrick J. Ryan
Assistant Examiner—N. Edwards

[57] ABSTRACT

Bulked random copolyamide yarns having enhanced dyeability as compared to comparable nylon 6 fibers are disclosed. The random copolyamides contain from 80 to 96% by weight of nylon 6 units and 4 to 20% by weight of nylon 6,6 units with from 90 to 94% nylon 6 and 6 to 10% nylon 6,6 being the preferred range. Further increases in dyeability are obtained by steam heat-setting the yarns.

2 Claims, No Drawings

BULKED RANDOM COPOLYAMIDE YARNS OF NYLON 6 AND NYLON 6,6 HAVING ENHANCED DYEABILITY

This is a continuation of application Ser. No. 07/882,383 filed May 12, 1992, now abandoned.

FIELD OF THE INVENTION

The present invention relates to bulked yarns prepared from random copolymers of nylon 6 and nylon 6,6 and which have enhanced dye rates as compared to comparable nylon 6 fibers. Further increases in dye rate may be achieved by steam heatsetting the yarns.

BACKGROUND OF THE INVENTION

Present printing and continuous dyeing processes typically involve applying various dyes, treating with heat or steam to fix the dyes, washing to remove excess dye, and drying to remove the water introduced in the wash. In order to obtain high clarity and registration of the dyed pattern, it is necessary to set the dyes as quickly and completely as possible so that the various colors do not intermix. Examples of these processes are Kusters dyeing, silkscreen printing and the Millitron process. With the advent of computer-controlled printing processes, intricate multicolored designs, or "color graphics", for carpets, upholstery, pile fabrics, etc., are increasing in popularity. For these processes, it is especially important that the various dyes remain where they are deposited on the fabric and do not have a chance to migrate and mix. Thus, in order to achieve high pattern clarity and registration, it is necessary that the fabric have a high dye strike rate. It is also desirable to operate the dyeing process at room temperature to reduce energy costs by eliminating the expense of passing the fabric through a steamer to fix the dye.

Salt-blended copolymers of nylon 6 and nylon 6,6 are disclosed in U.S. Pat. Nos. 2,252,555 and 2,252,557, where they were reported to be useful in the preparation of clear films due to their low crystallinity and in making cold drawn fibers for use in the textile industry.

U.S. Pat. No. 4,729,923 discloses room temperature dyeable crimped polyamide fibers with small spherulites and a process of making such fibers from 1–6% nylon 6, 94–99% nylon 6,6 and 0.001–2% soluble inorganic metal salt, which preferably is calcium acetate.

U.S. Pat. No. 4,559,196 describes random copolymer yarns of nylon 6,6 and 6–12% nylon 6 wherein the dyeability of the yarns is enhanced by treatment with saturated steam at temperatures close to the melting point of the copolymer.

SUMMARY OF THE INVENTION

The present invention relates to certain bulked copolyamide yarns which have an enhanced dye rate as compared to yarns of nylon 6 and are accordingly especially useful in continuous dyeing and printing processes. The yarns of the invention are prepared from random copolymers containing about 4 to 20 wt % repeating nylon 6,6 units of the structure

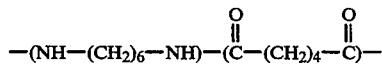

and 80 to 96 weight percent repeating nylon 6 units of the structure

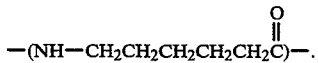

The fibers are bulked and optionally heat-set in steam to achieve the increased dye rate. Preferred ranges are about 6–10 wt % units of nylon 6,6 and about 90–94 wt % units of nylon 6. Certain of the yarns of the current invention are dyeable at room temperature.

DETAILED DESCRIPTION

It has now been found that certain of the copolyamide yarns of the present invention have cold dye rates after bulking of approximately $1000 \times 10^{-5}$ sec$^{-1}$ and greater, and thus are dyeable at room temperature. These fibers are useful in bulked continuous filament yarns and staple carpet fibers for direct tuftable style carpets having yarn deniers of 1100 to 5000 as well as in fiber for use in upholstery having yarn deniers of 500 to 800. The high dye strike rate eliminates both the need for heatsetting the fibers or fabric prior to the dyeing process, as well as the need for applying heat or steam to set the dyes following their application. This is an advantage over fibers formed of nylon 6 homopolymer or nylon 6,6 homopolymers, each of which require steam heatsetting in order to be dyed at room temperature. If desired, however, the bulked copolyamide yarns of the present invention may be twistset in steam to achieve even further increases in dye rate. Such fibers are particularly useful in cut pile carpet styles.

The high cold dye rate of the fibers of the present invention can also eliminate the need for washing following the dyeing step since, through a combination of factors such as applying the dye at a reduced pH (in the range of 2–4 as compared to the more conventional 6–7 range commonly used to apply acid dyes to nylon), increased surface area via trilobal or other multilobal fiber cross-section, increased dye concentration, and adjustment of polymer end group chemistry, the dye is completely fixed to the fiber in the ambient temperature dyeing step, resulting in less environmental pre- and post-dyeing treatment costs, as well as costs associated with the drying step. The fibers of the present invention may also be used in conventional dyeing processes to increase line speed due to the reduced residence time required for dye fixation.

The preferred process for preparing the nylon 6,6 random copolymer yarns of the present invention includes the steps of:

(a) forming an aqueous solution containing, on a dry ingredients basis, about 4–20 weight percent nylon 6,6 salt (hexamethylene adipate) and about 80–96 percent by weight of a nylon 6 precursor such as $\epsilon$-caprolactam or 6-aminocaproic acid, and polymerizing in a batch process or, alternatively, pumping the hexamethylene adipate salt as a side stream solution to a continuous polymerizer supply line containing the nylon 6 precursor;

(b) extruding the polymer, typically at a relative viscosity of from 25 to 100, into filaments;

(c) drawing the freshly-spun filaments to increase their orientation using conventional drawing methods; and (d) bulking the filaments in a conventional manner using any of the well-known bulking means such as gear crimping, stuffer box or fluid jet bulking, typically at a temperature of 120° to 240° C., followed by optional heat-setting.

Alternatively the yarns can be prepared by melt-blending nylon 6 and nylon 6,6 polymers in suitable proportions prior to spinning provided, however, that the melt is maintained prior to spinning under conditions of time and temperature which permit random copolymerization to occur via transamidation reactions.

As can be seen from the data presented in the Examples set forth hereinafter, the dye rate of the fibers increases with increased fiber surface area. Irrespective of the yarn cross-section or denier, however, bulked yarns of these copolymers will consistently exhibit an increased dye rate as compared to homopolymer yarns of the same denier and cross-section.

TEST METHODS

Relative Viscosity (RV) is the formic acid relative viscosity as described at col. 2, lines 42-51, in Jennings, U.S. Pat. No. 4,702,875.

Modification Ratio (MR) is as defined and measured in Bankar et al., U.S. Pat. No. 4,492,731.

Dye rates, also referred to herein as cold dye rates, were measured using the method for determining the Cold Dye Rate which is described in Windley, U.S. Pat. No. 4,919,874.

EXAMPLES

The following examples are offered for the purpose of illustrating the invention and are not intended to be limiting. Percentages are by weight except where otherwise indicated.

In each of Examples 1-3 reported in the TABLE below, polymer flake having an RV in the range of from 25 to 100 and prepared by batch aqueous polymerization of ε-caprolactam optionally with hexamethylene adipate salt in the ratios reported in column 2 of the TABLE, was dried in air at 105° C. and supplied to a twin-screw extruder where it was melted at a temperature of 260°-270° C. and supplied to a gear pump at a pressure of 500 psig ($3.45 \times 10^3$ kPa). The molten polymer was then pumped through a transfer line, spin block, and spinneret containing 17 capillaries of 9 mils ($23 \times 10^{-5}$ m) diameter and a capillary length of 12 mils ($30 \times 10^{-5}$ m) at 260° to 280° C. and at sufficient throughput to produce a multifilament yarn, the individual fibers of which have a round cross-section and an average yarn denier of 340 (20.0 denier per filament) when spun at 300 meters per minute and drawn 3× over a hot (150° C.) pin at a take-up rate of 900 meters per minute. The filaments were air quenched and a water-based finish lubricant applied for operability.

Three tubes of the above-prepared filaments were placed on a creel and supplied as a single yarn bundle to a pair of heated (145° C.) rolls on an air-jet bulking apparatus. The yarn was advanced over the hot rolls in 5½ wraps at a speed of 932 meters/minute and entered a dual impingement bulking jet of the type described in U.S. Pat. No. 3,525,134 supplied with air at a temperature of 190° C. and a pressure of 60 psig (413 kPa). The yarn exited the bulking jet and was collected on a 0.38 m diameter perforated drum rotating at a speed of 55 rpm where it formed a caterpillar-like structure. The yarn was removed from the drum by a take-up roll operated at a surface speed of 707 meters per minute and advanced to a windup at a speed of 854 meters per minute. A secondary oil based finish was applied to the yarn just prior to winding.

The as-produced round fibers of Examples 2 and 3 have respective cold dye rates of 157 and $6.65 \times 10^{-5}$ sec$^{-1}$ before bulking. After bulking the cold dye rate approximately doubles in Example 2, with more than a 4× increase in the fiber of Example 3 which has 8% nylon 6,6 units. In each case the cold dye rate of the bulked copolyamide fiber is significantly greater than the dye rate of a control bulked nylon 6 homopolymer fiber (Example 1). Additional improvements in cold dye rate can be obtained by steam heatsetting the yarn subsequent to bulking. For example, for random copolymer yarns containing 92% repeating units of nylon 6 and 8% units of nylon 6,6 as shown in Example 3, the cold dye rate (pH 4) after steam heatsetting at 132° C. is greater than $3000 \times 10^{-5}$ sec$^{-1}$. The heatsetting temperature must be adjusted according to the percentage of nylon 6,6 repeating units present, since the melting point of the fibers decreases with increasing nylon 6,6 content (at the levels employed herein) and the filaments will melt if the heatsetting temperature is too high. Recommended heatsetting temperatures for filaments spun from polymer containing greater than about 10% nylon 6,6 content are about 100°-110° C. in steam (Superba heatsetting).

Although the bulked, unheatset fibers of Examples 2 and 3 do not have dye strike rates of $1000 \times 10^{-5}$ sec$^{-1}$ or greater and therefore are not room temperature dyeable, further increases in dye rate can be obtained by reducing the pH of the dye bath, by reducing the denier of the fiber, or by increasing the fiber shape factor. The relationship between these parameters and the dye rate is discussed in *Textile Research Journal*, 55, 10 (1985), pp. 573-579 and 579-581.

Because cross-sections other than round are important in various applications in the fiber industry, theoretical dye rates were calculated for 20 denier filaments having a Shape Factor of 1.9 and an MR of 2.5 from the actual dye rates measured from Examples 1-3. As described in the *Textile Research Journal* articles identified above, these theoretical dye rates were calculated using the equation:

$$S_1/S_2 = (P_1/P_2)^2$$

$$\text{where } P = \text{Shape Factor} = \frac{1}{2\sqrt{\pi}} \times \frac{\text{perimeter}}{\sqrt{\text{area}}}$$

and where $S_1$ is the experimentally determined dye rate for a fiber having the Shape Factor $P_1$ equal to 1.0 (round cross-section), and $S_2$ is the calculated dye rate for the 20 denier, 2.5 MR fiber having the Shape Factor $P_2$ of 1.9.

As shown in the TABLE (Examples 2A and 3A), increasing the Shape Factor from 1.0 to 1.9 results in a significant increase in dye rate when compared both to the round cross-section filament having the same polymer composition and also to predicted dye rates for comparably treated nylon 6 homopolymer filaments having the same 1.9 Shape Factor. Such fibers are predicted to be room-temperature dyeable when the Shape Factor is increased to 1.9.

TABLE

| Example | 6/6,6 Ratio | Melt Point °C. | Dye Bath pH | Filament Shape Factor | Filament Mod. Ratio | Cold Dye Rate AP* | Cold Dye Rate Bulked* | Cold Dye Rate Heatset | Heatset Steam T. °C. |
|---|---|---|---|---|---|---|---|---|---|
| 1 | 100/0 | 220 | 4 | 1.0 | Round | 85.0 | 232 | 1190 | 132 |
| 1A | 100/0 | 220 | 4 | 1.9 | 2.5 | 307.0 | 838 | 4296 | 132 |
| 2 | 96/4 | 212 | 4 | 1.0 | Round | 157.0 | 366 | 2220 | 132 |
| 2A | 96/4 | 212 | 4 | 1.9 | 2.5 | 567.0 | 1321 | 8014 | 132 |
| 3 | 92/8 | 204 | 4 | 1.0 | Round | 196.0 | 914 | 3060 | 132 |
| 3A | 92/8 | 204 | 4 | 1.9 | 2.5 | 708.0 | 3300 | 11047 | 132 |

*($\times 10^{-5}$ sec$^{-1}$), 25° C.

What is claimed is:

1. A bulked random copolyamide yarn comprising 4 to 20 weight percent repeating units of the structure

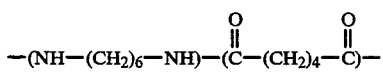

and 80 to 96 weight percent repeating units of the structure

said yarn before heat-setting having a cold dye rate of at least $1000 \times 10^{-5}$ sec$^{-1}$.

2. The yarn of claim 1 wherein the random copolyamide contains 6 to 10 weight percent repeating units of the structure

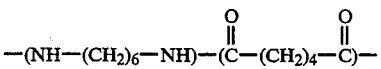

and 90 to 94 weight percent repeating units of the structure

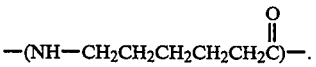.

* * * * *